(12) United States Patent
Francisco

(10) Patent No.: US 9,745,897 B2
(45) Date of Patent: Aug. 29, 2017

(54) ANTI-WINDMILLING STARTER GENERATOR

(75) Inventor: Jay M. Francisco, Chula Vista, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1965 days.

(21) Appl. No.: 13/005,567

(22) Filed: Jan. 13, 2011

(65) Prior Publication Data
US 2012/0180498 A1   Jul. 19, 2012

(51) Int. Cl.
| | | |
|---|---|---|
| H02P 3/08 | (2006.01) | |
| F02C 7/277 | (2006.01) | |
| F02C 7/268 | (2006.01) | |
| F01D 17/06 | (2006.01) | |
| F01D 19/00 | (2006.01) | |
| F02C 7/32 | (2006.01) | |

(52) U.S. Cl.
CPC .............. *F02C 7/277* (2013.01); *F01D 17/06* (2013.01); *F01D 19/00* (2013.01); *F02C 7/268* (2013.01); *F02C 7/32* (2013.01); *H02P 3/08* (2013.01); *F05B 2270/32* (2013.01); *F05B 2270/3201* (2013.01); *F05D 2220/50* (2013.01)

(58) Field of Classification Search
CPC ... H02P 3/08–3/16; F02C 7/268; F02C 7/275; F05D 2220/50
USPC ................. 60/223, 226.1; 318/139, 375–381; 322/6, 7, 13, 59, 61; 290/23, 29, 31, 290/36 R, 39, 40 R, 40 C
See application file for complete search history.

(56) References Cited

U.S. PATENT DOCUMENTS

| | | | | |
|---|---|---|---|---|
| 3,532,951 A | * | 10/1970 | Hovance | .................... H02P 3/12 318/373 |
| 3,584,281 A | * | 6/1971 | Reeves | .................... H02P 7/293 318/258 |
| 5,117,143 A | | 5/1992 | Iddings | |
| 5,921,753 A | | 7/1999 | Ames | |
| 6,312,215 B1 | | 11/2001 | Walker | |
| 6,672,049 B2 | | 1/2004 | Franchet et al. | |
| 6,768,278 B2 | * | 7/2004 | Xu | ......................... F02C 7/268 318/140 |
| 7,090,172 B2 | | 8/2006 | Kubica et al. | |
| 7,262,539 B2 | * | 8/2007 | Dooley | ........................ 310/184 |

(Continued)

FOREIGN PATENT DOCUMENTS

| | | |
|---|---|---|
| EP | 1990506 A2 | 11/2008 |
| EP | 2077379 A2 | 7/2009 |

(Continued)

OTHER PUBLICATIONS

Guru, Bhag S. Hiziroğlu, Hüseyin R.. (2001). Electric Machinery and Transformers (3rd Edition)—6.11 Braking or Reversing DC Motors. Oxford University Press.*

European Search Report dated May 12, 2012.

*Primary Examiner* — Laert Dounis
(74) *Attorney, Agent, or Firm* — Carlson, Gaskey & Olds, PC

(57) ABSTRACT

An APU has a gas turbine engine and a starter generator to be selectively driven by the gas turbine engine. A sensor senses windmilling of components associated with the starter generator. A lock feature limits rotation within the starter generator when windmilling is sensed. A method of operation is also disclosed.

6 Claims, 2 Drawing Sheets

(56) References Cited

U.S. PATENT DOCUMENTS

| | | |
|---|---|---|
| 7,567,047 B2 | 7/2009 | Rozman |
| 7,638,959 B2 | 12/2009 | Rozman et al. |
| 7,662,059 B2 | 2/2010 | McCune |
| 7,710,058 B2 | 5/2010 | Rozman et al. |
| 7,791,238 B2 | 9/2010 | Pal et al. |
| 2007/0213917 A1* | 9/2007 | Bruno et al. ............... 701/100 |
| 2007/0289310 A1* | 12/2007 | Dooley et al. ............... 60/773 |
| 2009/0079381 A1* | 3/2009 | Puglisi ............... 318/762 |

FOREIGN PATENT DOCUMENTS

| | | |
|---|---|---|
| GB | 2422875 A | 8/2006 |
| WO | 2006096845 A2 | 9/2006 |

* cited by examiner

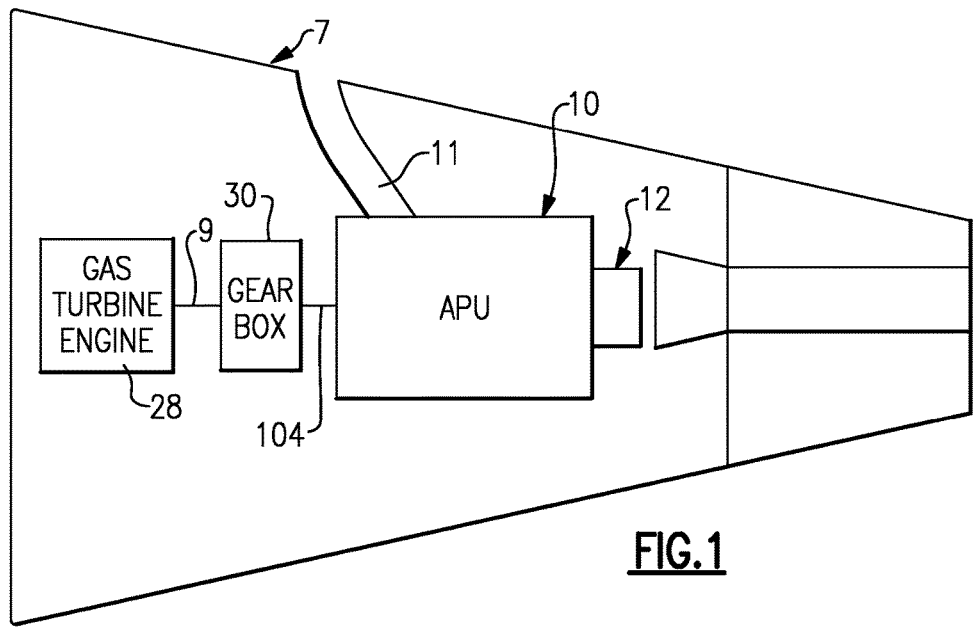
FIG.1
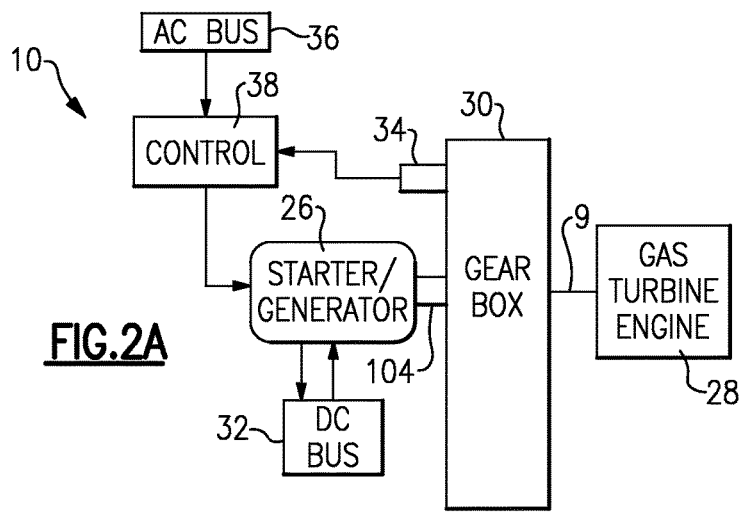
FIG.2A
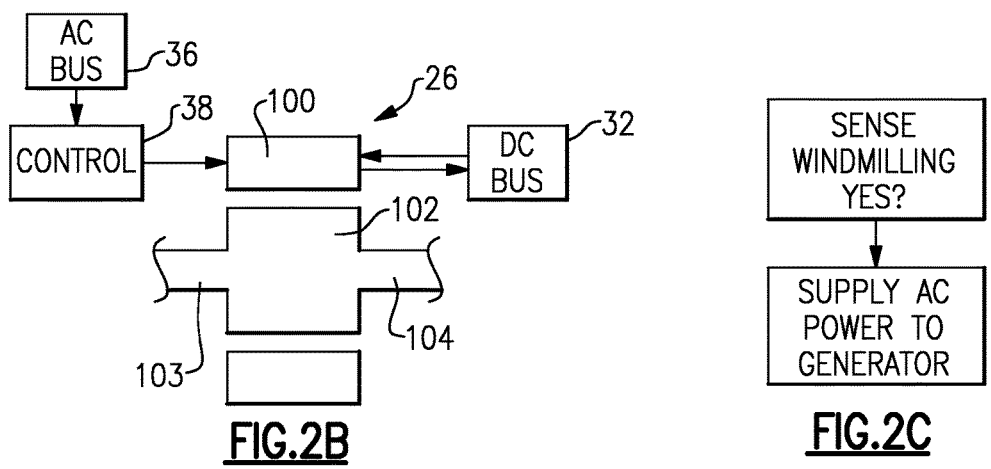
FIG.2B
FIG.2C

ANTI-WINDMILLING STARTER GENERATOR

BACKGROUND

This application relates to a starter generator which has primary use on an aircraft, and wherein the starter generator is provided with an anti-windmilling feature.

Aircraft are typically provided with an auxiliary power unit, which may be mounted in the tail of the aircraft. An auxiliary power unit (APU) typically includes a gas turbine engine which is started and drives a generator utilized to provide electrical power to start the main aircraft engines. The generator also supplies electricity for various applications. The APU is typically provided with an inlet duct to supply air for use by its gas turbine engine, and an exhaust at the tail of the vehicle. The APU is typically shut down when not needed during flight of the aircraft. However, sometimes the APU may be started during flight.

During flight, ambient air may pass through the inlet duct without a door, and may drive components of the gas turbine engine. As an example, the air may drive the compressor or turbine rotors. When these rotors are driven to rotate by the air, an output shaft from the gas turbine engine leading into the generator may also be driven.

This is called "windmilling" and is undesirable for a number of reasons. First, components of the generator may rotate, but may not be provided with adequate lubricant to bearings in the APU. Also, driving the generator can generate electrical energy which can raise challenges on the overall control of the electrical grid for the aircraft. Finally, it may sometimes be necessary to start the APU while the aircraft is in flight. Windmilling makes starting the APU more challenging.

SUMMARY

An APU has a gas turbine engine and a starter generator to be selectively driven by the gas turbine engine. A sensor senses windmilling of components associated with the starter generator. A lock feature limits rotation within the starter generator when windmilling is sensed.

A method of operation is also disclosed and claimed.

These and other features of the present invention can be best understood from the following specification and drawings, the following of which is a brief description.

BRIEF DESCRIPTION OF THE DRAWINGS

FIG. 1 schematically shows an aircraft.
FIG. 2A shows a portion of a starter generator.
FIG. 2B shows a detail of the starter generator.
FIG. 2C is a flowchart.

DETAILED DESCRIPTION

Figure 3:
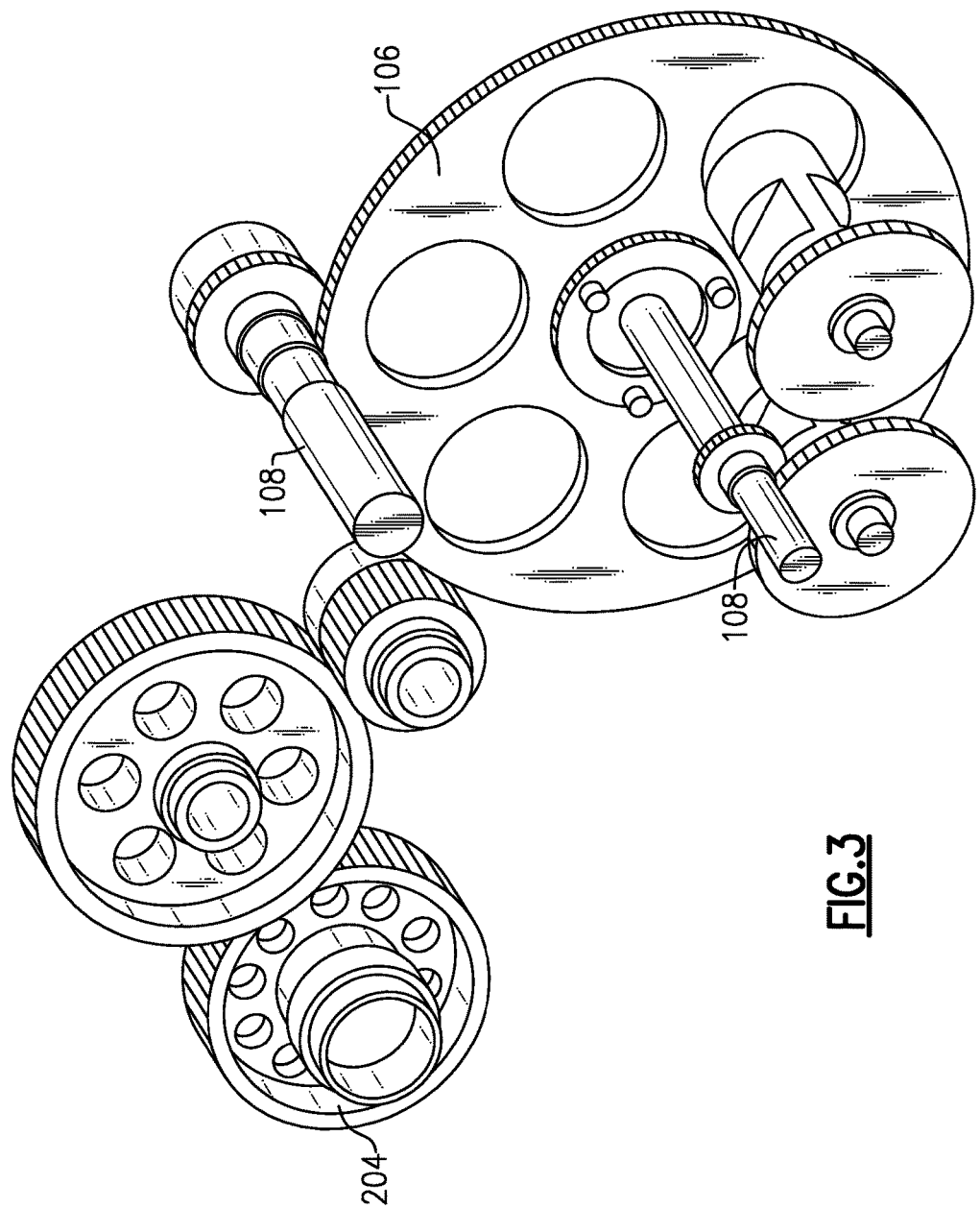
FIG. 3 shows details of the starter generator.

FIG. 1 shows an aircraft 7 incorporating the present invention. As shown, an APU 10 receives air from an inlet duct 11, and delivers the air to an outlet nozzle 12. As known, the APU would typically include a gas turbine engine including compressor and turbine rotors.

An output shaft 104 from the APU serves as a starter shaft for a main gas turbine engine 28 associated with the aircraft.

As mentioned above, during flight, windmilling can occur when air passes through the duct 11 and across the gas turbine engine in the APU 10.

FIG. 2A shows a system for addressing the windmilling effect.

The starter generator 26 drives shaft 104 to provide starter energy to the main gas turbine engine 28. A gear box 30 connects the starter generator 26 to the gas turbine engine 28 through the shaft 104 and a shaft 9.

As shown in FIG. 2A, during normal operation, the generator 26 will also supply DC power to a DC bus 32. At the same time, the DC bus 32 can supply DC power to the starter generator 26 to power it as a motor.

An AC bus 36 is associated with a power control 38 which can selectively supply AC power to the starter generator 26. A sensor 34 senses the rotation of a gear within the gearbox 30. If rotation of the gear is sensed when rotation is not desired (i.e. windmilling), then a signal is sent to the control 38, and AC power from the bus 36 can pass to the starter generator 26.

As shown in FIG. 2B, the starter generator 26 may include a rotor 102 having an input shaft 103 to be driven to rotate an output shaft 104 which is to be connected into the gearbox 30.

A stator 100 includes electric coils, and is typically connected to the DC bus 32. However, when the control 38 supplies AC power from bus 36 to the stator coil 100, this provides a lock feature, and prevents or limits rotation of the rotor 102 of the starter generator 26. The stator 100, and rotor 102 are designed to typically be powered by DC power. That is, they are designed to expect power flow in a single direction. The provision of AC power to a DC stator should result in the AC rotor not being driven for rotation, but rather lock against any significant rotation. This occurs by because of the sinusoidal variation from negative to positive polarity of the Alternating Current (AC). The Direct Current motor will rotate in one direction and then reverse direction in a very small amount of angular movement simulation no continuous rotation.

Thus, as shown in FIG. 2C, if windmilling is sensed, then AC power is supplied to the generator 26 to lock the generator 26. Of course, some periodic sensing to determine if the windmilling would still be occurring can be utilized, and the supply of AC current stopped if the windmilling has also stopped.

Windmilling being "sensed" can be performed at any one of the several gears shown in FIG. 3. As shown, the gearbox 30 includes a large pump drive gear 106 driving a plurality of pump shafts 108, and generator input gears 204 driving other shafts to drive the large gears 106. The speed sensor 34 can sense rotation of any one of these gears. Of course, other locations for sensing rotation, and other ways of sensing windmilling can be utilized. Should rotation be sensed when it should not be occurring, then a determination can be made that windmilling is occurring and a signal sent to the control 38.

In operation, the supply of AC power may not actually eliminate all rotation, however, it will significantly reduce any undesired rotation, such as caused by windmilling. The claims use the term "lock for limiting rotation," which should be interpreted with this in mind.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An auxiliary power unit (APU) comprising:
   a gas turbine engine, and a starter generator to be selectively driven by said gas turbine engine;
   a sensor for sensing windmilling associated with said starter generator, and a lock feature for limiting rotation within said starter generator when windmilling is sensed; and
   said starter generator includes a DC powered stator and rotor, and said lock feature includes a selective supply of AC power to said stator to limit said rotor from rotation relative to said stator, the selective supply of AC power resulting in sinusoidal variation of negative to positive polarity, and resulting in said rotor being driven in reverse rotations in small amounts of angular movement to limit said rotor from rotation relative to said stator.

2. The APU as set forth in claim 1, wherein said starter generator is connected into a gearbox, and said sensor sensing rotation of a gear within said gearbox.

3. The APU as set forth in claim 1, wherein a control selectively communicates AC power to said stator only when windmilling is sensed.

4. An auxiliary power unit (APU) and air supply system comprising:
   a gas turbine engine, and a starter generator to be selectively driven by said gas turbine engine;
   a sensor for sensing undesired rotation of components associated with said starter generator, and a lock feature for limiting rotation of said components within said starter generator when undesired rotation is sensed; and
   the lock feature including a supply of AC power into a DC powered stator associated with a DC powered rotor, and a control communicating with said sensor, and receiving a signal when undesired rotation is sensed to supply AC power to said stator, the selective supply of AC power resulting in sinusoidal variation of negative to positive polarity, and resulting in said rotor being driven in reverse rotations in small amounts of angular movement to limit said rotor from rotation relative to said stator.

5. The APU and air supply system as set forth in claim 4, wherein said starter generator is connected into a gearbox, and said sensor sensing undesired rotation of a gear within said gearbox.

6. A method of operating an auxiliary power unit (APU) comprising the steps of:
   (a) sensing undesired rotation in a starter generator associated with an APU;
   (b) locking components of the starter generator against undesired rotation when undesired rotation is sensed; and
   (c) the starter generator is a DC component, and the locking includes supplying AC power to a stator in the starter generator when undesired rotation is sensed, the selective supply of AC power resulting in sinusoidal variation of negative to positive polarity, and resulting in a rotor being driven in reverse rotations in small amounts of angular movement to limit said rotor from rotation relative to said stator.

* * * * *